US006853626B1

(12) United States Patent
Farhang-Boroujeny et al.

(10) Patent No.: US 6,853,626 B1
(45) Date of Patent: Feb. 8, 2005

(54) METHOD AND APPARATUS FOR ECHO CANCELLATION IN AN ASYMMETRIC COMMUNICATION SYSTEM

(75) Inventors: Behrouz Farhang-Boroujeny, Singapore (SG); Chong Yuan Ng, Singapore (SG)

(73) Assignees: National University of Singapore, Singapore (SG); Agency for Science, Technology and Research, Singapore (SG)

( * ) Notice: Subject to any disclaimer, the term of this patent is extended or adjusted under 35 U.S.C. 154(b) by 0 days.

(21) Appl. No.: 09/532,536

(22) Filed: Mar. 22, 2000

(51) Int. Cl.[7] .............................. H04B 3/20; H04J 3/16
(52) U.S. Cl. ....................... 370/286; 370/465; 375/222; 379/406.01
(58) Field of Search ................... 370/465, 201, 370/286, 289, 290; 375/222, 350, 284; 379/406.01, 406.05, 406.08; 381/71.1, 93, 94.1

(56) References Cited

U.S. PATENT DOCUMENTS

| | | | |
|---|---|---|---|
| 5,317,596 A | 5/1994 | Ho et al. | |
| 5,917,809 A | 6/1999 | Ribner et al. | |
| 6,259,680 B1 * | 7/2001 | Blackwell et al. | 370/286 |
| 6,421,377 B1 * | 7/2002 | Langberg et al. | 370/290 |
| 6,542,477 B1 * | 4/2003 | Pal et al. | 370/286 |
| 6,590,976 B1 * | 7/2003 | Lin | 379/406.1 |
| 6,594,360 B1 * | 7/2003 | Gazsi et al. | 379/406.08 |

OTHER PUBLICATIONS

Ho et al., (1996), Discrete Multitone Echo Cancelation, IEEE Transaction on Communications vol. 44 No. 7, pp. 817–825.

Ruiz et al., (1992), Discrete Multiple Tone Modulation with Coset Coding for the Spectrally Shaped Channel, IEEE Transactions on Communications, vol. 40, No. 6 pp. 1012–1029.

\* cited by examiner

Primary Examiner—Andy Lee
(74) Attorney, Agent, or Firm—Knobbe, Martens, Olson and Bear, LLP

(57) ABSTRACT

A method and system for canceling echo signals originating from a transmitter at a predetermined data rate. The echo signals are received by a receiver at a different data rate. The echo system is configured to manipulate data rates of transmitted signals, and reconstruct echo signals for consideration by the receiver. In view of the band-limited nature of these echo signals, the invention intelligently reduces the computational complexity of reconstructing and canceling echo signals.

42 Claims, 3 Drawing Sheets

METHOD AND APPARATUS FOR ECHO CANCELLATION IN AN ASYMMETRIC COMMUNICATION SYSTEM

BACKGROUND OF THE INVENTION

1. Field of the Invention

The invention relates generally to digital communication systems. More particularly, this invention relates to a method and apparatus for echo cancellation in full duplex asymmetric communication systems.

2. Description of the Related Art

Communication systems are very common in today's society. These systems have evolved from devices that provide simple half-duplex data transmissions to sophisticated full-duplex systems providing voice, data, and video transmission and reception. Half-duplex communication commonly refers to the communication of information between a transmitter and a receiver in one direction at a time. On the other hand, full-duplex communication commonly refers to the communication of information between the transmitter and receiver in both directions at the same time, i.e., simultaneously. However, with sophistication comes added complexity which often necessitates corrective measures. One complexity that is associated with fill-duplex systems is a phenomenon known as "echo". The production of echo in a full-duplex system is often attributed to leakage of at least a portion of a transmitted signal into an unintended receiver, such as a receiver portion of a transceiver or a co-located receiver.

FIG. 1 shows a functional block diagram of an exemplary modem system. At a near-end of the system $100a$ is a transmitter $110a$ and a receiver $120a$. The transmitter $110a$ and receiver $120a$ are isolated or separated from each other by a hybrid $150a$. As is well known in the art, a hybrid may be defined as a circuit that routes signals from one source (e.g., the transmitter $110a$) to a desired output port, while preventing the signals from passage to an unintended destination (e.g., the receiver $120a$). The transmitter $110a$ includes a digital modulator $112a$ that modulates information signals onto a carrier signal in preparation for transmission over a communication medium 170. The communication medium 170 may be a wired (e.g., telephone lines) and/or a wireless (e.g., airwaves) medium. The transmitter $110a$ further includes a digital-to-analog converter (DAC) $114a$, which converts digital signals received from the digital modulator $112a$ into analog signals prior to transmission over the medium 170. The digital signal stream has a sampling rate of "fs". Similarly, the receiver $120a$ includes an analog-to-digital converter (ADC) $124a$, which converts analog signals received from the communication medium 170 into digital signals. The receiver $120a$ further includes a digital demodulator $122a$ that demodulates the digital signals from the carrier signal for further processing at an ultimate destination (not shown in this figure), e.g., a computer, television, or other application device.

The far-end portion of the system $100b$ comprises a mirrored-structure of the near-end portion of the system $100a$. More particularly, the system $100b$ further comprises a transmitter $110b$ and a receiver $120b$. The transmitter $110b$ and receiver $120b$ are isolated or separated from each other by a hybrid $150b$. The transmitter $110b$ includes a digital modulator $112b$ that modulates information signals onto a carrier signal for transmission over a communication medium 170. The transmitter $110b$ further includes a digital-to-analog converter (DAC) $114b$, which converts digital signals received from the digital modulator $112b$ into analog signals prior to transmission over the medium 170. Similarly, the receiver $120b$ includes an analog-to-digital converter (ADC) $124b$, which converts analog signals received from the communication medium 170 into digital signals. The receiver $120b$ further includes a digital demodulator $122a$ that demodulates the digital signals from the carrier signal for further processing at an ultimate destination (not shown in this figure), e.g., a computer.

In practice, at least a portion of signals transmitted from the near-end transmitter $110a$ leak through the hybrid $150a$ into the near-end receiver $120a$. This leakage contaminates the near-end receiver $120a$ in the form of an echo by mixing with or superimposing signals received from the far-end transmitter $110b$. Thus, this superimposition causes interference by the echo signal with the intended information signals. The same is true for the far-end transceiver.

To circumvent such echo in full duplex systems, one of two methods may be applied. The first method is frequency division multiplexing (FDM), which may be defined as a multiplexing technique that uses different frequencies to combine multiple streams of signals for transmission over a communications medium. More particularly, forward and reverse streams of signals travelling in opposite directions occupy different portions of the frequency spectrum, with the effect that they can be easily separated in frequency at the receivers through a variety of signal processing techniques. FDM is not bandwidth efficient because it does not make full use of available bandwidth. The second method is echo cancellation, which allows forward and reverse signals to occupy overlapping frequency bands. A copy of the echo signal is reconstructed and subsequently subtracted at the affected receiver. Current echo cancellation techniques have been burdened in many applications by too much computational power and inferior speed performance rendering them undesirable.

Therefore, there is a need in the communications technology for a method and system that reduces computational requirement of echo cancellation. The method and system should be adaptable using common efficient and stable techniques without adding implementation hindrances.

SUMMARY OF THE INVENTION

The invention provides a method of canceling echo signals in a communication system. The communication system comprises a receiver that receives the echo signals at a first data rate, and a transmitter that is configured to transmit signals at a second data rate. In one embodiment, the method comprises increasing the data rate of the transmitted signals from the second data rate to a higher data rate. The method further comprises estimating echo signal components based at least in part on the higher data rate signals. The method further comprises matching the data rate of the estimated echo signal with the first data rate of the receiver. In another embodiment, the method comprises filtering the transmitted signals to substantially remove frequency components above a cut-off frequency that is equivalent to at least one-half of the predetermined data rate. The method further comprises reducing the data rate of the filtered signals from the predetermined data rate to a lower data rate. The method further comprises estimating echo signal components based at least in part on the filtered signals.

The invention further provides a system for canceling echo signals received by a receiver that is configured to operate at a first data rate. The echo signals originate from a transmitter that is configured to transmit signals at a second data rate. In one embodiment, the system comprises a filter that is configured to substantially remove from the transmitted signals frequency components above a cut-off frequency that is equivalent to at least one-half of the first data rate. The system further comprises a decimator that is configured to reduce the data rate of the filtered signals from the second data rate to a lower data rate. The system further comprises an echo canceler that is configured to estimate echo signal components based at least in part on the filtered signals at the lower data rate. In another embodiment, the system comprises a first upsampler that is configured to increase the data rate of the transmitted signals from the second data rate to a higher data rate. The system further comprises an echo canceler that is configured to estimate an echo signal based at least in part on the upsampled signals. The system further comprises a second upsampler that is configured to match the data rate of the estimated echo signal with the first data rate of the receiver.

In yet another embodiment, the system comprises means for filtering the transmitted signals to substantially remove frequency components above a cut-off frequency that is equivalent to at least one-half of the predetermined data rate. The system further comprises means for reducing the data rate of the filtered signals from the predetermined data rate to a lower data rate. The system further comprises means for estimating echo signal components based at least in part on the filtered signals. In yet another embodiment, the system further comprises means for increasing the data rate of the transmitted signals from the second data rate to a higher data rate. The system further comprises means for estimating echo signal components based at least in part on the higher data rate signals. The system further comprises means for matching the data rate of the estimated echo signal with the first data rate of the receiver.

BRIEF DESCRIPTION OF THE DRAWINGS

The above and other aspects, features, and advantages of the invention will be better understood by referring to the following detailed description, which should be read in conjunction with the accompanying drawings, in which.

DETAILED DESCRIPTION OF THE INVENTION

The following description is not to be taken in a limiting sense, but is made merely for the purpose of describing the general principles of the invention. The scope of the invention should be determined with reference to the claims.

Figure 1:
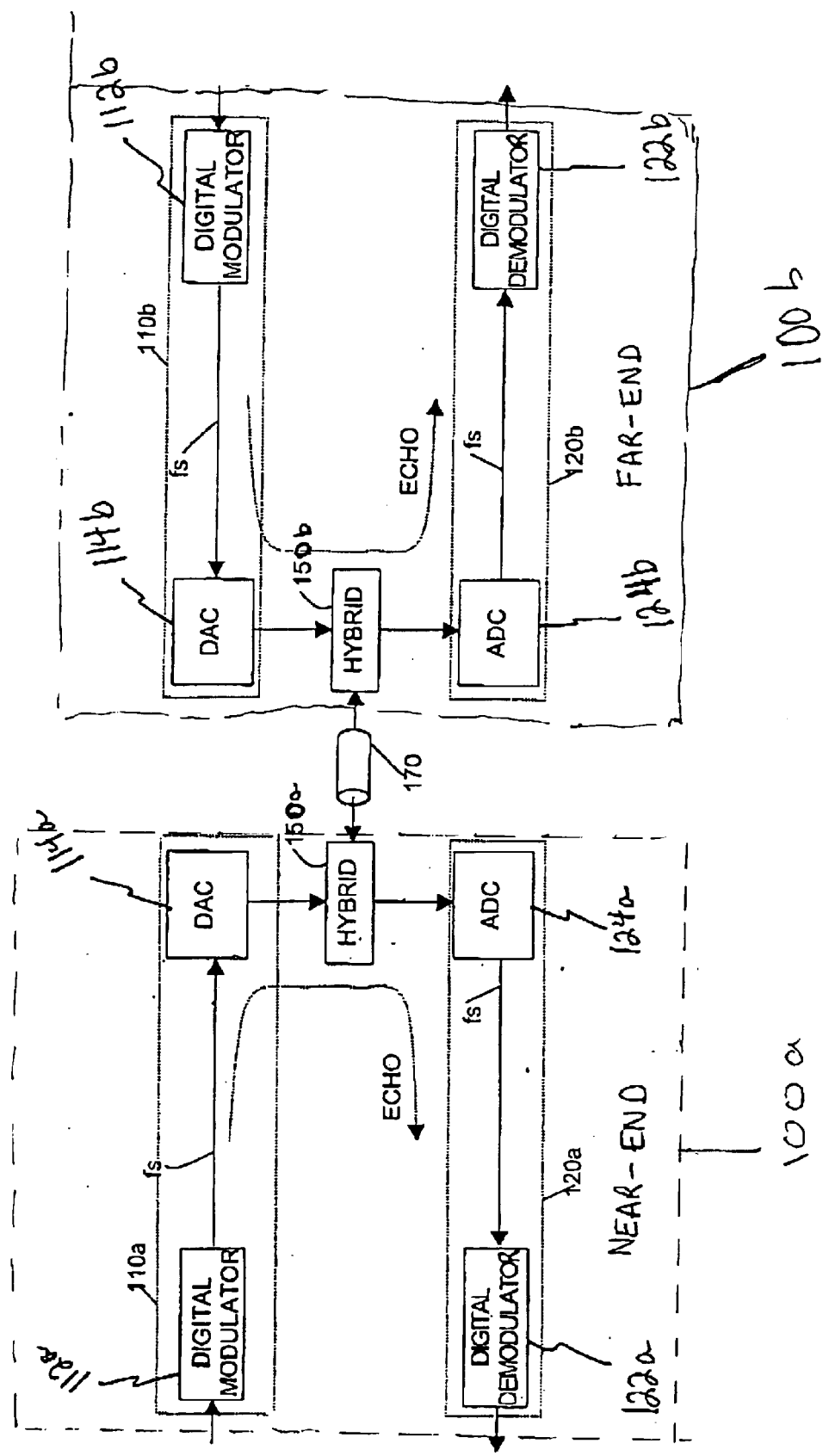
FIG. 1 is a functional block diagram of an exemplary modem system.
Figure 2:
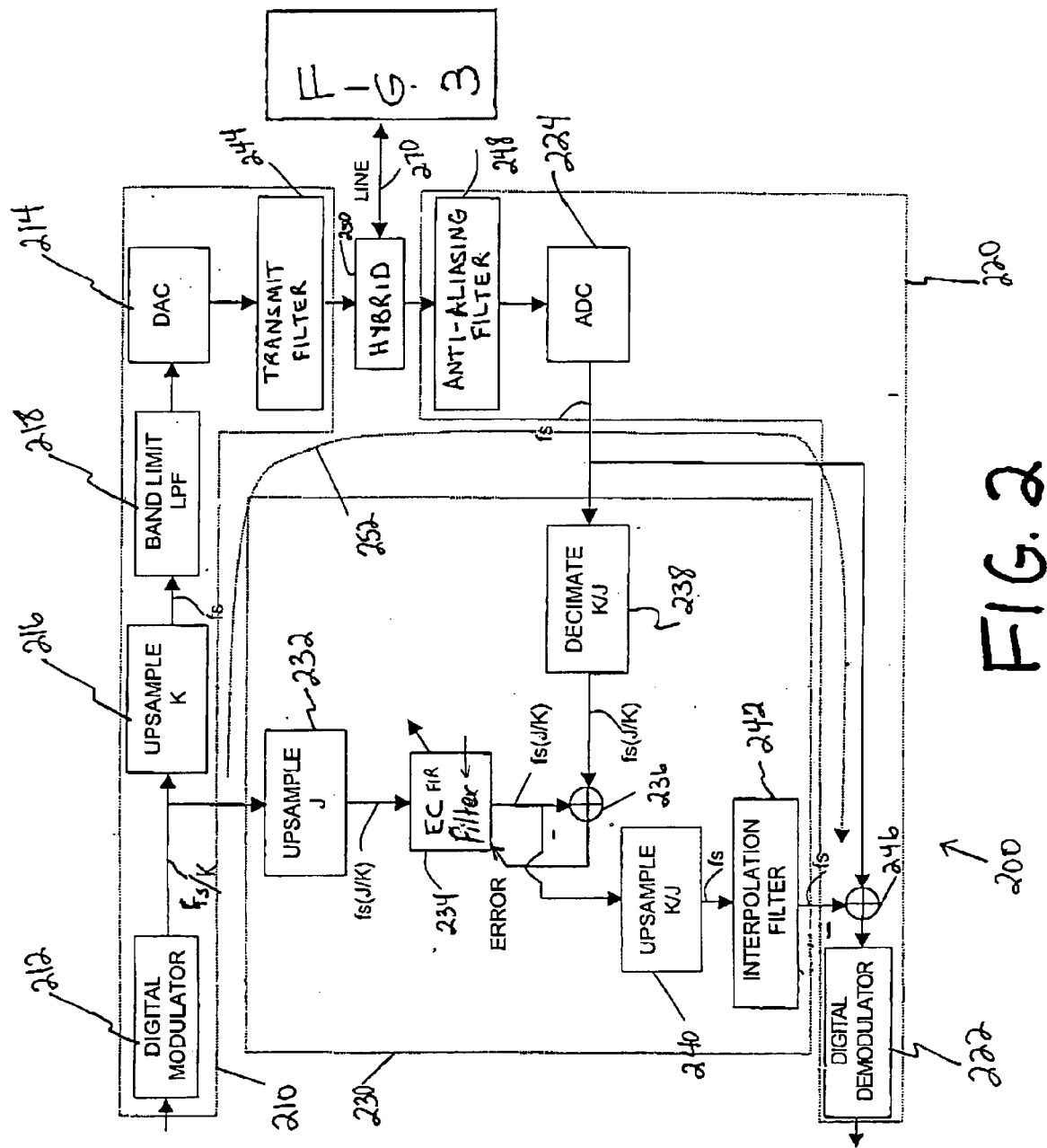
FIG. 2 is a functional block diagram of a near-end modem system in accordance with the invention.

FIG. 2 shows a functional block diagram of one embodiment of a near-end modem system 200 in accordance with the invention. The near-end system is sometimes referred to as a remote-terminal (RT) system, whereas a far-end system (see FIG. 3) is sometimes referred to as a central office (CO) system. In this embodiment, the RT system 200 comprises an asymmetric digital subscriber loop (ADSL) system which conforms to ADSL standard promulgated by the American National Standard Institute (ANSI) in T1.413-1998, which is incorporated in its entirety by reference. The communication channel from the RT system 200 to the CO system is commonly referred to as an "upstream" channel, and that from the CO system to the RT system 200 is commonly referred to as a "downstream" channel.

As shown in FIG. 2, the RT system 200 comprises a transmitter 210 that is configured to transmit signals over a communication medium 270 via a hybrid 250. The RT system 200 further comprises a receiver 220 that is configured to receive signals over the communication medium 270 via the hybrid 250. The RT system 200 further comprises an echo canceler (EC) subsystem 230 that is configured to cancel or minimize echo signals. As shown in FIG. 2, the echo path is represented pictorially by an echo channel 252, and it is understood that such pictorial representation is intended to describe the general direction of echo flow and, thus, is not intended to describe the physical path of echo signals. Each of these subsystems is described in detail below.

The transmitter 210 comprises a digital modulator 212 that receives and modulates a digital information signal onto a carrier signal. The output of the digital modulator 212 is a modulated discrete-time sequence signal having a data or sampling rate of fs/K, where fs is the downstream transmission data or sampling rate and K is a constant integer. The modulated discrete-time sequence signal is fed into an up-sampler 216 to be upsampled by a factor K. Upsampling by a factor K of a discrete-time sequence signal may be accomplished mathematically by inserting K-1 sequence points with zero amplitude between each of the samples or sequence points of the modulated sequence, and increasing the sampling rate by a factor of K. Upsampling is basically the reverse process of downsampling.

In an ADSL system, the downstream sampling rate of transmitted signals is K times greater than that of the upstream sampling rate, where K=8. More particularly, the sampling rate of the downstream channel is typically about fs=2.208 MHz. The sampling rate of the upstream channel is typically about fs/8=276 kHz. Since, both the upstream and downstream channels are band-limited, the echo channel 252 is also band-limited. As will be appreciated and understood by those of ordinary skill in the art, a continuous-time signal may be sampled into a discrete-time sequence without a loss of information when the sampling rate (i.e., Nyquist frequency or sampling rate) is at least two times the highest frequency component of the original continuous-time signal. In this embodiment, it is desirable to sample signals of the echo channel 252 at a minimum rate possible (i.e., fs/K), so that the corresponding EC subsystem 230 uses a smaller number of tap weights than that of higher sampling rates. Ideally, the number of tap weights of the EC subsystem 230 is substantially equal to the number of discrete samples of the impulse response h(t) of the echo channel 252. For a fixed duration of the impulse response h(t), the number of tape weights required by the EC subsystem 230 depends on the sampling rate. Thus, it is desirable to drive the EC subsystem 230 by an input signal having the least sampling rate possible.

As noted above, the sampling rate of the modulated signal (i.e., output of the digital modulator 212) is fs/K. Thus, the echo channel of such an ADSL system is band-limited to a frequency band that is one-half (½) of the sampling rate (i.e., fs/K) of the upstream channel. Accordingly, in one embodiment, the echo channel 252 is band-limited to fs/2K (e.g., 2.208 MHz/16=138 kHz), since a bandwidth of 138 kHz is sufficient for signals of the transmitter 210. However, in practice the echo channel 252 may still have appreciable or significant energy in frequency bands that are greater than fs/2K. The presence of frequency components above fs/2K may hamper or reduce the accuracy of performance of the EC subsystem 230 that operates at a sampling rate of fs/K. Thus, it is desirable to introduce an additional band limiting filter (e.g., low pass filter) 218 into the echo path at the RT system 210. Accordingly, the RT system 210 further comprises a band limiting filter 218 that is configured to attenuate echo signals having frequency components above fs(J/2K), where J is a positive integer less than K and K/J is also an integer. In one embodiment, it is desirable to select J=2, which yields an EC subsystem that is usually less than 100 taps long in ADSL implementation. The transmitter 210 further comprises a digital-to-analog converter (DAC) 214 which receives output signals from the band limiting filter 218 to convert digital signals to analog form for transmission. The DAC 214 feeds converted analog signals into a transmit filter 244, which filters undesired frequencies from analog signals before transmission via the hybrid 250 to the communication medium 270.

The receiver 220 comprises an anti-aliasing filter 248 that receives signals via the hybrid 250 from the communication medium 270. The anti-aliasing filter 248 feeds its output signals, which are in analog form, into an analog-to-digital converter (ADC) 224. The ADC 224 converts analog signals into a digital or discrete-time sequence at a sampling rate fs. The ADC 224 feeds its digitized sequence into a subtractor 246 and into the EC subsystem 230 for further processing.

The EC subsystem 230 comprises an echo canceler (EC) finite impulse response (FIR) filter 234 in the time-domain. In one embodiment, the EC FIR filter 234 may comprise a transversal filter. To provide an input signal having a sampling rate of fs(J/K) into the EC FIR filter 234, the output signal of the digital modulator 212 is fed into an upsampler 232 that is configured to upsample the modulated signal by a factor J from its original sampling rate fs/K. The upsampler 232 outputs the upsampled signal with a sampling rate of fs(J/K). After proper training (see description below), the EC FIR filter 234 is configured to reconstruct from the upsampled signal a signal that is substantially identical to the echo signal, i.e., output signals of the ADC 224 having a sampling rate of fs, after being decimated by a factor K/J. Decimation by a factor of K/J may be accomplished mathematically by extracting every K/Jth sample from the digital sequence.

Pursuant to the ANSI standard, a predetermined period of time is dedicated to properly train the EC FIR filter 234 at the RT system 200 and CO system 300. During such period, only one modem system (e.g., RT system 200) transmits signals while the other modem system (e.g., CO system 300) remains silent. Thus, any signals received by the transmitting system represent mainly echo signals. In this embodiment, the EC FIR filter 234 feeds the reconstructed echo signal into a subtractor 236, which subtracts the reconstructed echo signal from the actual echo signal received from the decimator 238. The subtractor 236 may generate an "error" signal which is fed back into the EC FIR filter 234 to dynamically adapt the EC FIR filter 234 to changing echo conditions. The dynamic adaptation of the EC FIR filter 234 may be necessary because of possible changes in impedance characteristics of the communication medium and variation in echo conditions from one installation to another. With a sampling rate of fs(J/K), the error signal may be used to update the EC FIR filter 234 using any variant of the family of least means square (LMS) adaptive algorithms. The adaptation may be used during the training period of the EC FIR filter 234, or during full-duplex operation to track and compensate for any variations in echo channel characteristics.

Since echo signals have a limited bandwidth of fs(J/2K), the reconstructed echo signal of the EC FIR filter 234 may be interpolated by a factor of K/J to accurately represent the echo signals of the echo channel 252 at each sample point. Such interpolation may be carried out using multi-rate signal processing techniques. More particularly, interpolation by K/J may be accomplished by first upsampling the reconstructed echo signal by a factor of K/J using the upsampler 240. In the frequency domain, upsampling causes the frequency band to shrink by a factor of K/J in frequency, and the shank frequency band is replicated (K/J-1) times in the frequency domain. Interpolation is accomplished by passing the upsampled signal through an interpolation (low pass) filter 242 that is configured to remove the replicated (K/J-1) frequency bands produced by the upsampler 240. The output of the interpolation filter 242 is fed into a subtractor 246, which subtracts the output of the interpolation filter 242 from output signals of the ADC 224 at a common sampling rate fs to cancel the echo signals. During full-duplex operation, the output of the subtractor 246 is fed into the digital demodulator 222 for demodulation in accordance with the implemented demodulation scheme.

Figure 3:
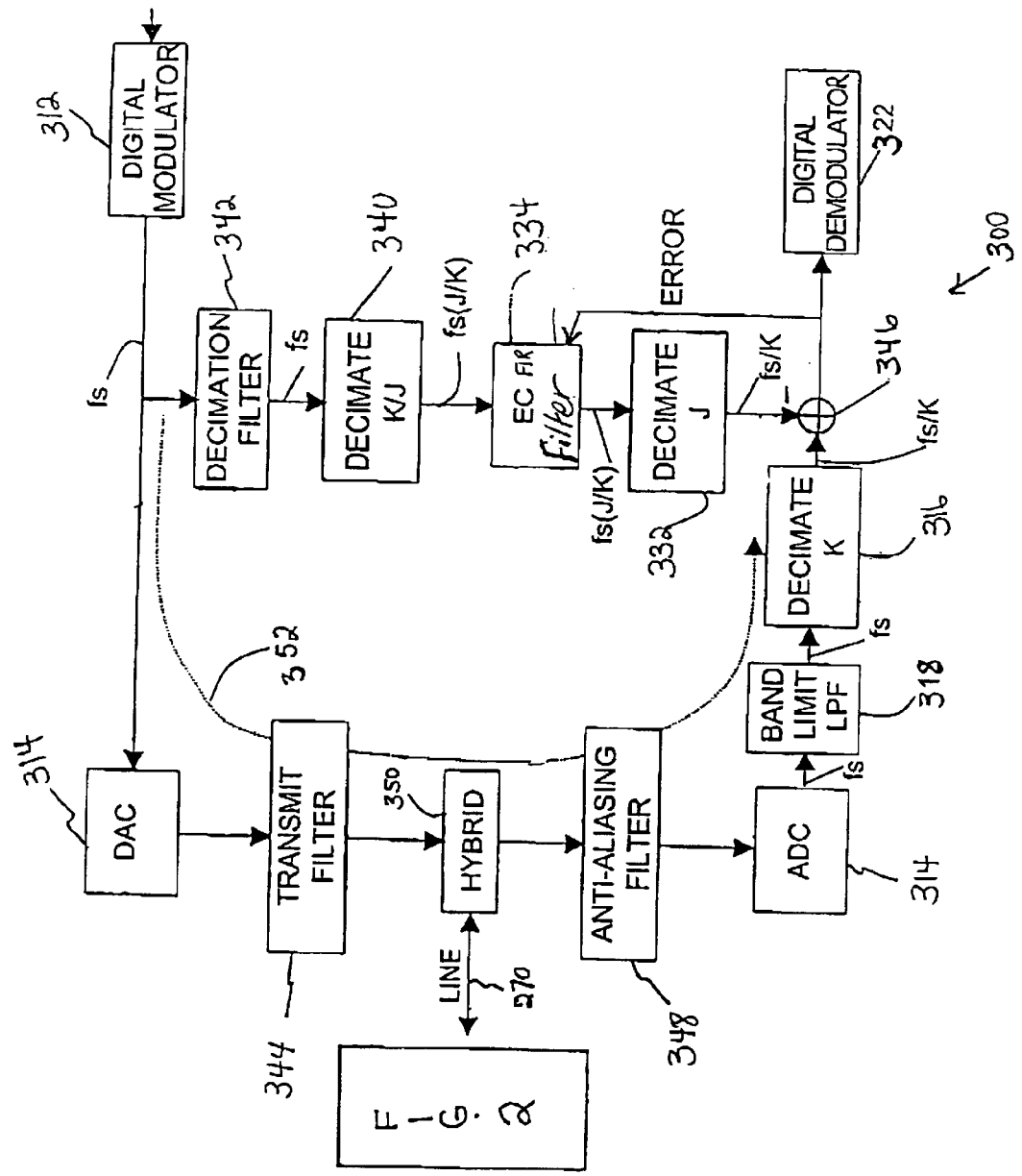
FIG. 3 is a functional block diagram of a far-end modem system in accordance with the invention.

FIG. 3 is a functional block diagram of the CO modem system 300 in accordance with the invention. As will be apparent from the following description, the CO system 300 is similar to the RT system 200. More particularly, the transmit portion of the CO system 300 comprises a digital modulator 312 connected to a DAC 314 and a transmit filter 344. The structure and operation of each of these transmitter components is substantially similar to its respective component in the transmitter 210 (FIG. 2). The receiver portion of the CO system 300 comprises an anti-aliasing filter 348 connected to an ADC 314, which is configured to convert analog signals received from the RT system 200 over the communication medium 270 into digital form, i.e., discrete-time sequence. The ADC 314 forwards the discrete-time sequence to a band limiting (low pass) filter 318 to band limit received echo signals to fs(J/2K). The output of the band limiting filter 318 is fed into a decimator 316 to decimate the discrete-time sequence by a factor of K, thereby yielding an output discrete-time sequence having a data or sampling rate of fs/K. The output of the decimator 316 is fed into a subtractor 346 for further processing, as described below.

As described in connection with the RT system 200, the CO system 300 also comprises an EC subsystem that is configured to cancel echo signals at the CO system 300. As shown in FIG. 3, the echo path is represented by an echo channel 352. Because of the band limiting filter 318 and other band limiting effects inherent in ADSL systems, the echo channel 352 is practically band limited to fs(J/2K). Only the frequency portion of the transmit signal (from the digital modulator 312) that coincides with the bandwidth of the echo channel is expected to appear as echo at the receiver of the CO system 300. Thus, frequency components of the transmit signal in the frequency band of 0-fs(J/2K) Hz are sufficient to reconstruct the echo signal by the EC subsystem. Accordingly, the EC subsystem comprises a decimation filter 342 that is configured to filter out frequency components outside fs(J/2K) of the transmit signal received from the digital modulator 312. As will be understood by one of ordinary skill in the art, the normalized upper cut-off frequency in designing the decimation filter 342 is $\pi/(K/J)$. The output of the decimation filter 342 is a discrete-time sequence having a sampling rate of fs that is fed into a decimator 340. The decimator 340 decimates the filtered discrete-time sequence by a factor of K/J to produce a discrete-time sequence having a sampling rate of fs(J/K).

The output sequence of the decimator 340 is fed into an EC FIR filter 334 that is configured to reconstruct an echo signal based on the transmit signal of the digital modulator 312. To compress the sampling rate from fs(J/K) down to fs/K, it is desirable to perform a decimation by a factor of J on the echo signal that is reconstructed by the EC 334. Accordingly, the output of the EC FIR filter 334 is fed into a decimator 332 to decimate the reconstructed echo signal by a factor of J and provide a discrete-time sequence having a sampling rate of fs/K. The output of the decimator 332, which represents the final reconstructed echo signal, is fed into the subtractor 346, which removes the reconstructed echo signal from the output sequence of the decimator 316, thereby canceling the echo signal produced by the echo channel 352.

As discussed in connection with the EC FIR filter 234, the output of the subtractor 346 may be used to produce an error signal to be fed back into the EC FIR filter 334 for adaptation. The error signal is used in an adaptation algorithm, such as one of the LMS-type algorithms known in the art. Since the error signal comprises a discrete-time sequence at a sampling rate of fs/K, the adaptive update in the LMS algorithm is carried out at the same rate of fs/K.

In light of the above description, it will be apparent to those of ordinary skill in the art to implement some or all of the components of the RT system 200 and CO system 300 using conventional software programming, dedicated hardware circuitry, or a combination of both. For example, the EC subsystems may be implemented using a programmable device, such as a microprocessor or an application specific integrated circuit (ASIC), that is programmed with instructions that performs the above-described functions.

In view of the foregoing, it will be appreciated that the invention overcomes the long-standing need for a method and system for efficiently canceling echo in modem systems, such as ADSL systems. The invention may be embodied in other specific forms without departing from its spirit or essential characteristics. The described embodiment is to be considered in all respects only illustrative and not restrictive. The scope of the invention is, therefore, indicated by the appended claims rather by the foregoing description. All changes that fall within the meaning and range of equivalency of the claims are to be embraced within their scope.

What is claimed is:

1. A method of canceling echo signals in a communication system comprising a transmitter that is configured to transmit signals at a predetermined data rate, and a receiver that receives the echo signals, the method comprising:
   filtering the transmitted signals to substantially remove frequency components above a cut-off frequency that is equivalent to at least one-half of the predetermined data rate;
   reducing the data rate of the filtered signals from the predetermined data rate to a lower data rate, the lower data rate being determined based at least in part on the frequency portion of the transmitter signals that coincide with bandwidth of the echo signals; and
   estimating echo signal components based at least in part on the filtered signals.

2. The method as defined in claim 1, further comprising reducing the data rate of the estimated echo signal to match the data rate of the receiver.

3. The method as defined in claim 1, further comprising subtracting the estimated echo signal from the echo signals.

4. The method as defined in claim 3, wherein estimating the echo signal includes responding to an error signal that is based at least in part on the result of subtracting.

5. The method as defined in claim 1, further comprising transmitting signals at the predetermined data rate of fs over a downstream channel, and receiving other signals at a data rate of fs/K over an upstream channel, wherein K is a positive integer.

6. The method as defined in claim 1, wherein filtering the transmitted signals includes removing frequency components above a cut-off frequency of fs(J/2K), and wherein fs is the predetermined data rate, K is a positive integer representing the ratio of fs divided by the data rate of the receiver, and J is a positive integer that is less than K.

7. The method as defined in claim 1, wherein filtering the transmitted signals includes removing frequency components above a cut-off frequency of at least one-half of the Nyquist frequency of the signal.

8. The method as defined in claim 1, wherein reducing the data rate of the filtered signals includes decimating the filtered signals by a factor of K/J, wherein K is a positive integer representing the ratio of the predetermined data rate divided by the data rate of the receiver, and J is a positive integer that is less than K.

9. The method as defined in claim 1, wherein estimating the echo signal includes transversally filtering the filtered signals and minimizing the number of filter tap weights.

10. The method as defined in claim 1, wherein the communication system further comprises an asymmetric digital subscriber loop (ADSL) system.

11. A method of canceling echo signals in a communication system comprising a receiver that receives the echo signals at a first data rate, and a transmitter that is configured to transmit signals at a second data rate, the method comprising:
    increasing the data rate of the transmitted signals from the second data rate to a higher data rate;
    estimating echo signal components based at least in part on the higher data rate signals; and
    matching the data rate of the estimated echo signal with the first data rate of the receiver.

12. The method as defined in claim 11, further comprising removing frequency components resulting from matching the data rate of the estimated echo signal.

13. The method as defined in claim 11, further comprising subtracting the estimated echo signal from the echo signals.

14. The method as defined in claim 13, wherein estimating the echo signal includes responding to an error signal that is based at least in part on the result of subtracting.

15. The method as defined in claim 11, further comprising transmitting signals at the second data rate of fs/K over an upstream channel, and receiving other signals at the first data rate of fs over a downstream channel, wherein K is a positive integer.

16. The method as defined in claim 11, further comprising removing frequency components above a cut-off frequency of fs(J/2K), wherein fs is the second data rate, K is a positive integer representing the ratio of fs divided by the first data rate, and J is a positive integer that is less than K.

17. The method as defined in claim 16, wherein removing frequency components includes removing components above a cut-off frequency of at least one-half of the Nyquist frequency of the transmitted signals.

18. The method as defined in claim 11, wherein increasing the data rate of the signal includes upsampling the signal by a factor of J, wherein J is a positive integer that is less than the ratio of the first data rate divided by the second data rate.

19. The method as defined in claim 11, wherein estimating the echo signal includes transversally filtering the higher data rate signals and minimizing the number of filter tap weights.

20. The method as defined in claim 11, wherein the communication system further comprises an asymmetric digital subscriber loop (ADSL) system.

21. A system for canceling echo signals received by a receiver that is configured to operate at a first data rate, the echo signals originating from a transmitter that is configured to transmit signals at a second data rate, the system comprising:
   a filter that is configured to substantially remove from the transmitted signals frequency components above a cut-off frequency that is equivalent to at least one-half of the first data rate:
   a decimator that is configured to reduce the data rate of the filtered signals from the second data rate to a lower data rate, the lower data rate being determined based at least in part on the frequency portion of the transmitter signals that coincide with bandwidth of the echo signals; and
   an echo canceler that is configured to estimate echo signal components based at least in part on the filtered signals at the lower data rate.

22. The system as defined in claim 21, further comprising another decimator that is configured to reduce the data rate of the estimated echo signal to match the first data rate of the receiver.

23. The system as defined in claim 21, further comprising a subtractor that is configured to subtract the estimated echo signal from the echo signals.

24. The system as defined in claim 23, wherein the echo canceler is configured to receive an error signal that is based at least in part on output of the subtractor.

25. The system as defined in claim 21, wherein the transmitter is configured to transmit signals at the second data rate of fs over a downstream channel, and the receiver is configured to receive another signal at the first data rate of fs/K over an upstream channel, wherein K is a positive integer.

26. The system as defined in claim 21, wherein the filter is configured to remove frequency components above a cut-off frequency of fs(J/2K), and wherein fs is the second data rate, K is a positive integer representing the ratio of fs divided by the first data rate, and J is a positive integer that is less than K.

27. The system as defined in claim 21, wherein the filter is configured to remove frequency components above a cut-off frequency of at least one-half of the Nyquist frequency of the transmitted signals.

28. The system as defined in claim 21, wherein the decimator is configured to decimate the filtered signals by a factor of K/J, wherein K is a positive integer representing the ratio of the second data rate divided by the first data rate, and J is a positive integer that is less than K.

29. The system as defined in claim 21, wherein the echo canceler includes a transversal filter having a minimized number of filter tap weights.

30. The system as defined in claim 21, further comprising an asymmetric digital subscriber loop (ADSL) system.

31. A system for canceling echo signals received by a receiver that is configured to operate at a first data rate, the echo signals resulting from a transmitter that is configured to transmit signals at a second data rate, the system comprising:
   a first upsampler that is configured to increase the data rate of the transmitted signals from the second data rate to a higher data rate;
   an echo canceler that is configured to estimate an echo signal based at least in part on the upsampled signals; and
   a second upsampler that is configured to match the data rate of the estimated echo signal with the first data rate of the receiver.

32. The system as defined in claim 31, further comprising a filter that is configured to remove frequency components from the estimated echo signal, the frequency components originating from the second up-sampler.

33. The system as defined in claim 31, further comprising a subtractor that is configured to subtract the estimated echo signal from the echo signals.

34. The system as defined in claim 33, wherein the echo canceler is configured to receive an error signal that is based at least in part on the output of the subtractor.

35. The system as defined in claim 31, wherein the transmitter is configured to transmit signals at the second data rate of fs/K over an upstream channel, and the receiver is configured to receive other signals at the first data rate of fs over a downstream channel, wherein K is a positive integer.

36. The system as defined in claim 31, further comprising another filter that is configured to remove frequency components above a cut-off frequency of fs(J/2K) from the transmitted signals, wherein fs is the first data rate, K is a positive integer representing the ratio of fs divided by the second data rate, and J is a positive integer that is less than K.

37. The system as defined in claim 36, wherein the other filter is configured to remove frequency components above a cut-off frequency of at least one-half of the Nyquist frequency of the transmitted signals.

38. The system as defined in claim 31, wherein the first upsampler is configured to increase the data rate of the transmitted signals by a factor of J, and wherein J is a positive integer that is less than the ratio of the first data rate divided by the second data rate.

39. The system as defined in claim 31, wherein the echo canceler includes a transversal filter having a minimized number of filter tap weights.

40. The system as defined in claim 31, further comprising an asymmetric digital subscriber loop (ADSL) system.

41. A system for canceling echo signals originating from a transmitter that is configured to transmit signals at a predetermined data rate, and arriving in a receiver that receives the echo signals, the system comprising:
   means for filtering the transmitted signals to substantially remove frequency components above a cut-off frequency that is equivalent to at least one-half of the predetermined data rate;
   means for reducing the data rate of the filtered signals from the predetermined data rate to a lower data rate, the lower data rate being determined based at least in part on the frequency portion of the transmitter signals that coincide with bandwidth of the echo signals; and
   means for estimating echo signal components based at least in part on the filtered signals.

42. A system for canceling echo signals arriving in a receiver that receives the echo signals at a first data rate, and originating from a transmitter that is configured to transmit signals at a second data rate, the system comprising:
   means for increasing the data rate of the transmitted signals from the second data rate to a higher data rate;
   means for estimating echo signal components based at least in part on the higher data rate signals; and
   means for matching the data rate of the estimated echo signal with the first data rate of the receiver.

* * * * *